INVENTORS:
DOMINIC A. D'AMATO
FREDERICO L. PARISI
BY
John D. Wilkins
ATTORNEY

Oct. 11, 1966  D. A. D'AMATO ET AL  3,277,693
DYNAMIC TESTER
Filed May 14, 1964  3 Sheets-Sheet 2
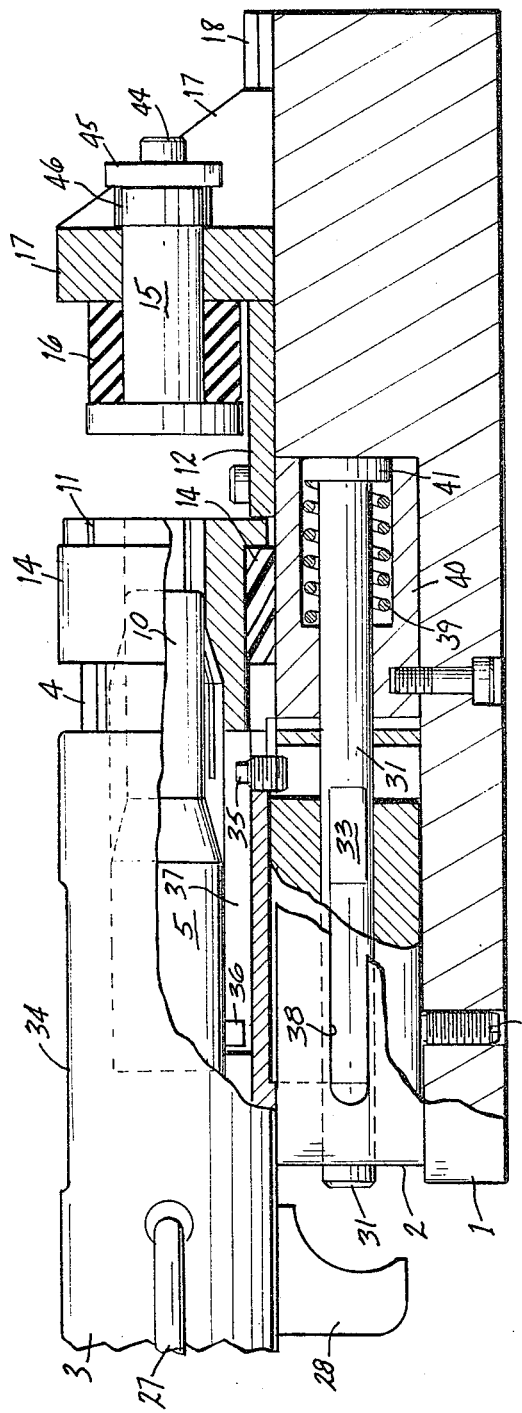
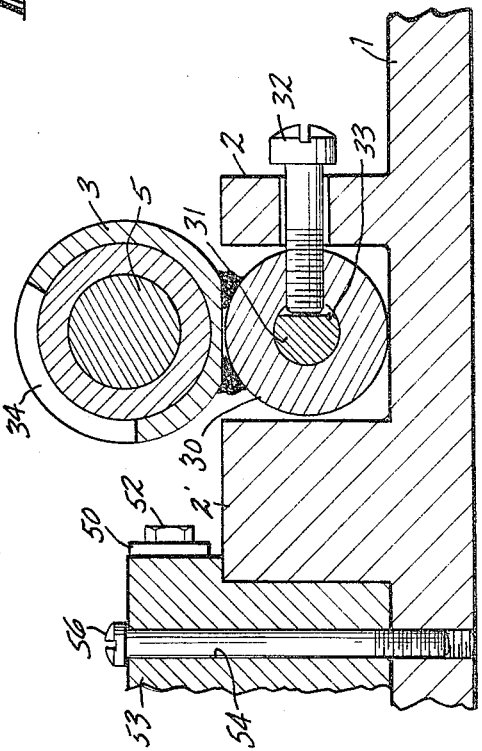
INVENTORS.
DOMINIC A. D'AMATO
FREDERICO L. PARISI
BY
*John D. Wilkins*
ATTORNEY Oct. 11, 1966  D. A. D'AMATO ET AL  3,277,693
DYNAMIC TESTER
Filed May 14, 1964  3 Sheets-Sheet 3
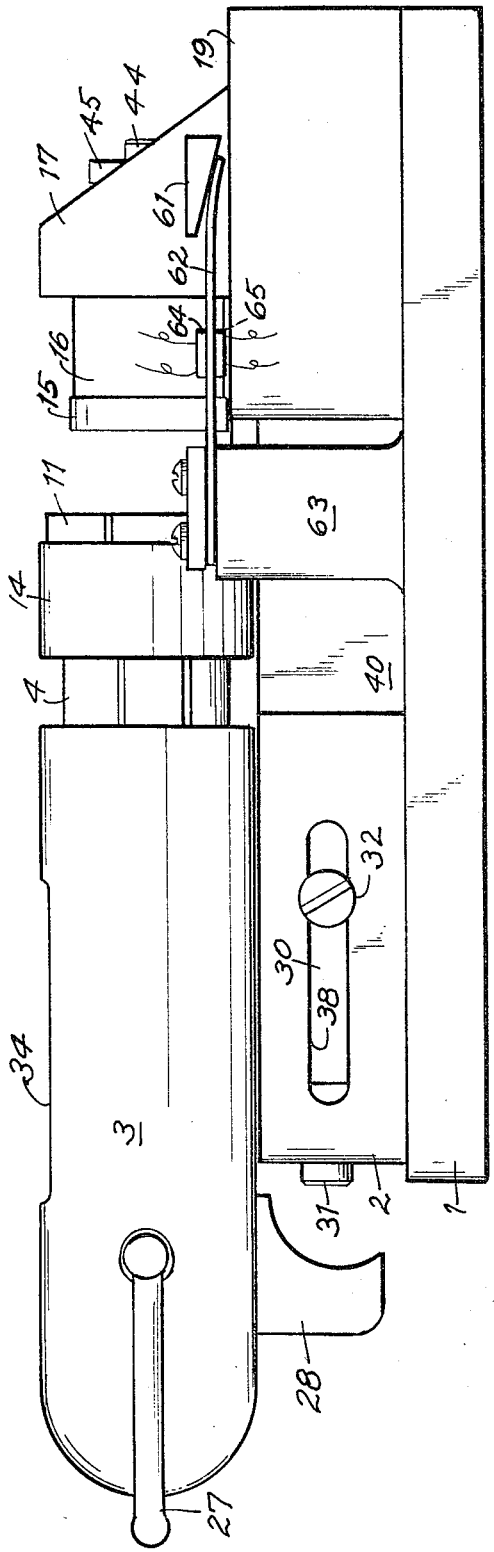
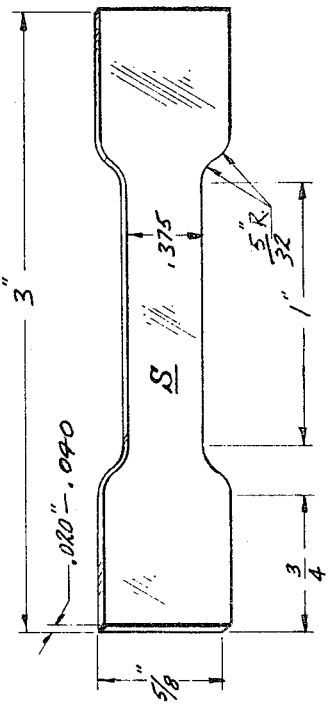
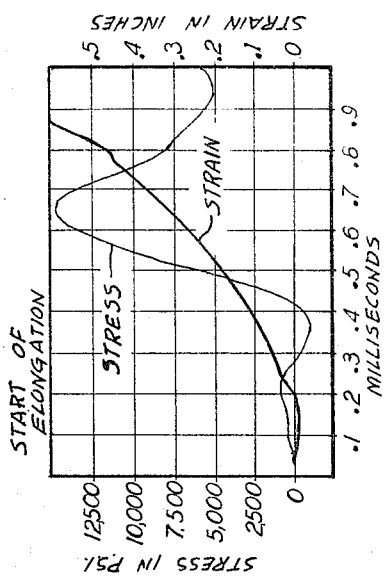
INVENTORS.
DOMINIC A. D'AMATO
FREDERICO L. PARISI
BY
John D. Wilkins
ATTORNEY 3,277,693
DYNAMIC TESTER
Dominic A. D'Amato, Cheshire, and Frederico L. Parisi, New Haven, Conn., assignors to Olin Mathieson Chemical Corporation, a corporation of Virginia
Filed May 14, 1964, Ser. No. 367,343
13 Claims. (Cl. 73—12)

This invention relates to a device for testing the strength of rate-sensitive materials such as resinous plastics and elastomers and more particularly to a device for dynamic testing of these materials such as high molecular weight, linear polyethylene and the like at high strain rates of loading, the rate of application of which is controlled to determine the dynamic stress-strain characteristics of these materials at anticipated high rates of loading.

The invention finds applicability especially in determining the suitability of such materials under high loading such as occurs in the tubular walls of shotshells. It is particularly useful in determining the tensile properties of relatively thin sheets and thin walled tubes.

In testing devices presently available, plastic samples are regularly tested at tester grip separation speeds of 0.05 of an inch per minute, of 0.20–0.25 of an inch per minute, of 2 inches per minute, and of 20 inches per minute. There are available devices attaining testing speeds of up to 15,000 inches per minute but these are limited to moderate rate levels, are large heavy affairs available at considerable expense, and usually involve a hydraulic or pneumatic system which adds to the complexity and maintenance expense of such machines. There is also known a test apparatus that can be used for tensile testing of elastomers at ultra-high strain speeds around 100,000 inches per minute, but this is a ponderous piece of equipment including more than one hydraulic system and requiring high-powered piston driving charges of air or explosive and also precision type valving, which are included to develop and control the large forces needed for bringing bulky parts of the apparatus up to speed. Such a high-powered device necessarily must include a heavy-duty piston arresting buffer system, which is also hydraulic. Since there is direct rigid coupling between the ballistic piston and the specimen to be tested, intense stress transients are developed in the test specimens resulting in stress records which are not very meaningful.

It is an object of this invention to provide a high rate tester which is relatively light and portable so that the whole unit, for example, can be placed and operated in temperature conditioning chambers to obtain readings at various desired temperatures without introducing variations during transfer of samples to the testers from the conditioning chambers which must be done as quickly as possible.

Another object is to develop a relatively simple low-cost device for testing the dynamic stress-strain properties of plastics especially including those in the form of thin samples having a thickness as low as one millimeter and even less.

Still another object is to provide a tensile property tester for plastics at permissible rates of strain relative to the sonic velocity of the material in a way avoiding the development of localized stress patterns so as to insure production of reliable data at rather symmetrical elastic deformations.

Other objects and advantages will be evident from a description of a specific embodiment of the invention when taken together with the accompanying drawing of the same in which:

FIG. 2 is an elevational view partly in section taken on line II—II of FIGURE 1;

FIG. 3 is a side elevational view taken on line III—III;

FIG. 4 is a transverse view in cross section taken on line IV—IV of FIGURE 1;

FIG. 5 is a perspective side elevational view showing the shape and dimensions of the tensile specimen to be used in the tester grips on the side of the device opposite that shown in FIGURE 3; and FIG. 6 is a representative record of results obtainable with the device of this invention coupled to suitable associated recording equipment of the oscillographic type.

Figure 1:
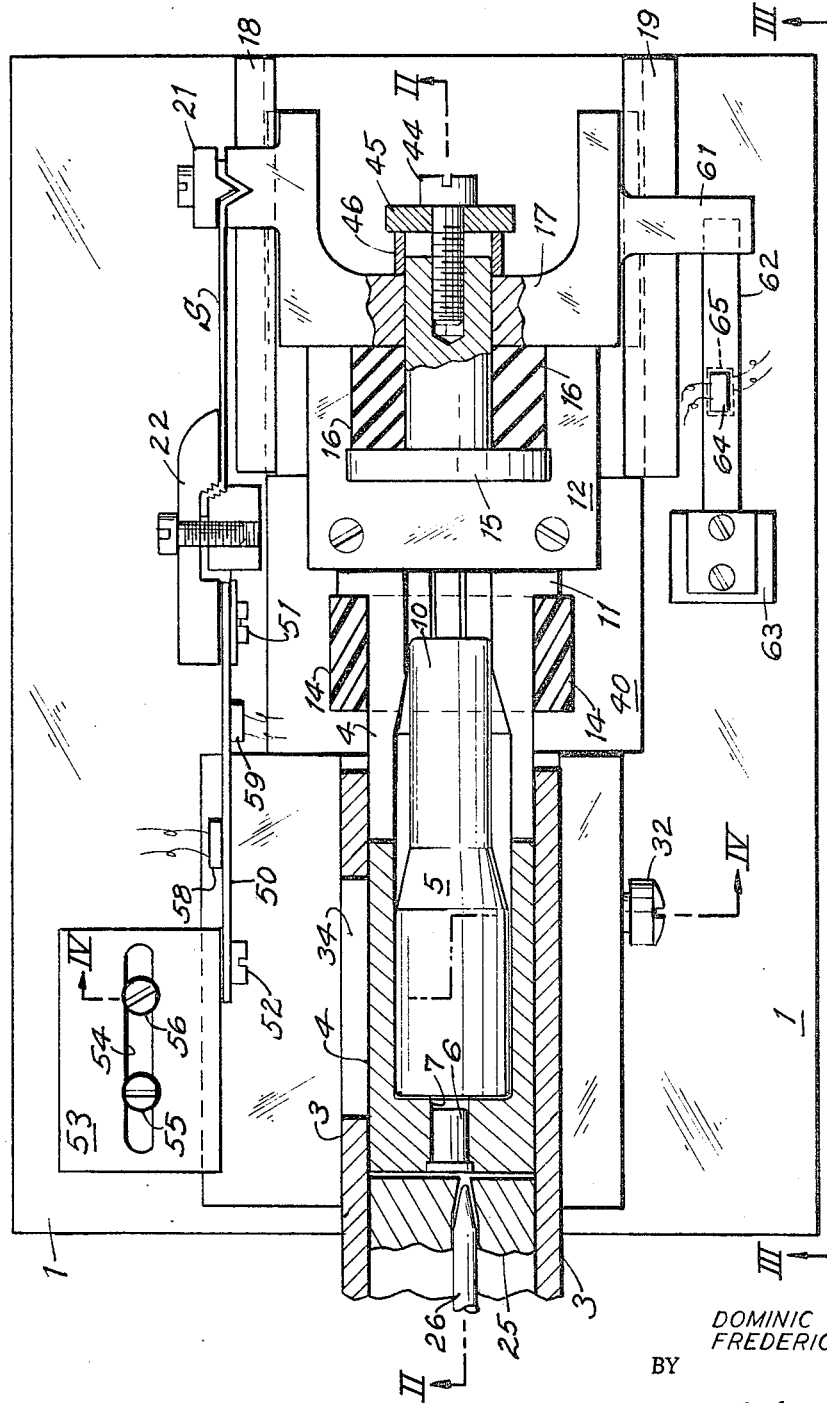
FIG. 1 is a semi-schematic plan view partly in cross section showing one preferred embodiment of the invention.

Basically, the test apparatus of this invention comprises a ballistic unit that fires a captive piston against an anvil yieldably mounted on a movable block in the form of a slidable crosshead, a test load driving buffer operable between the anvil and block and which together with the propellant charge selected control the rate of strain developed in the specimen one end of which is attached to the block, a load cell attached in series with the other end of the specimen for detecting the force developed, a strain gauge to detect the displacement, and means for recording the stress and strain detected as occurring in the specimen for measuring each. If mounted, the buffer can take the impact directly and the anvil be omitted.

The ballistic unit functions much like a gun system and the resulting high pressure gases accelerate a piston to suitable high velocities at a relatively low energy level. Instead of coupling the piston directly to the movable crosshead or block by contact with the piston from the start, and instead of impact loading by direct impact after the piston gets up to speed rapidly, buffered impact or loading with the flying piston is used by coupling the anvil and crosshead through the compressible driving buffer. In this way desired modification is obtained in the loading applied by the crosshead to which one end of the specimen is attached while the other end of the specimen is clamped to the load cell for measuring the force induced.

The test specimen and grips are located as close as possible to the center line of the applied load to minimize turning moments of force. To get a good gauge response the load cell, which includes a calibrated steel strip of the same configuration as the test specimen, is clamped in series to the other end of the test specimen. The remaining end of the load cell strip is attached to the frame.

Crosshead displacement and strain in the specimen is measured by a gauge which consists of an inclined plane carried by the crosshead and resting against the end of an initially flexed cantilever member on which are mounted strain gauges producing a change which is proportional to and detects the displacement. The cantilever member is a beam one end of which is mounted on the frame.

As the crosshead, driven through the control buffer, moves away, the cantilever member which is depressed to its maximum stress level initially has its acceleration force highest while the crosshead is also subjected to its highest acceleration.

For detecting the stress and strain, strain gauges are placed on both sides of the steel strip and on both sides of the cantilever or beam. The strain gauges of the cantilever member detect the resulting reduction in flexure and their resistance changes, arranged to be fed into a bridge circuit, are electronically subtracted for producing a record on an oscilloscope screen. This arrangement compensates for extraneous longitudinal stresses which might have occurred and the resulting trace on the oscilloscope indicates the displacement gauge to be quite reliable.

The strain gauges on the steel strip of the load cell are A.C. coupled to an oscilloscope with a time constant of 100 milliseconds; thus, with an action time of 1 millisecond, less than a 1 percent error can result from signal decay.

To satisfy the requirements of high acceleration while reducing or eliminating the high transients resulting from impact loading and the resulting localized failure from inability of the materal to respond fast enough, the impact of the piston accelerated by a given selected explosive charge to a predetermined velocity is modified to allow smooth acceleration of the crosshead and to meet the strain rate requirements by means of an adjustable driving control buffer acting as a loading modifier between the impacting piston and the longitudinally guided crosshead pulling the test specimen. For this purpose, buffers of damping materials generally softer than the material to be tested are used; for example, polyurethane rubber, synthetic rubber, neoprene, silicone rubber, and the like materials are contemplated. The test operator makes adjustment of the buffer material until the results are satisfactory. Adjustment is done by selection of the material, its length and cross section in the direction of and across the applied load, respectively, and by the degree of precompression of the driving control buffer. It is preferably tubular in shape as shown but may be cylindrical or of any suitable shape. It may be mounted to take the piston impact directly rather than through an anvil, although the inclusion of the latter is preferred. In fact, a film or coating is usually applied to the face of either the piston or the anvil for protection against damage from impact.

The driving control buffer, when suitably adjusted, acts to control the energy delivered, the acceleration, and the velocity during the work phase, and it also acts to damp out the high transients which usually accompany a firing cycle. Because it also eliminates all sharp discontinuities and step-forcing functions, difficulties in gauge response are minimized. Heretofore, where dynamic or shock load phenomena were studied, the tendency often is to shockmount the gauges to eliminate or reduce high transients superimposed on the primary signal but this tends to reduce the gauge response.

As shown comprehensively in the starting or ready-to-fire position of FIGURE 1, the device is mounted on a frame 1 having a pair of base uprights 2 and 2′ fixed to the frame for supporting the housing 3 of a ballistic section of the device having a barrel 4 carrying a captive piston 5 weighing about 0.42 of a pound driven by the explosive charge 6. Preferably this is in the form of one of a series of standard 0.22 caliber rim-fire cartridges, receivable in the cartridge chamber 7 of the barrel. There is a reduced front end 10 of the piston which is adapted to be driven out beyond the reduced muzzle 11 of the barrel 4 the muzzle of which is butted against a muzzle and crosshead stop block 12, also mounted fixedly upon the frame 1.

To prevent damage to the barrel while stopping the piston and to absorb residual energy in the event of excessive piston overtravel, the muzzle is of tined construction surrounded by a glass wound and reinforced plastic barrel buffering band 14 in accordance with U.S. Patent No. 2,845,908.

The device has an anvil 15 placed so that the force developed, when the piston front end 10 meets the anvil, is directly received by the anvil which applies this force acting through the test load driving control buffer 16 to a crosshead 17 which slidably carries the anvil upon a shank of which there is strung the buffer 16 of suitable tubular shape, dimensions, and material. The crosshead in turn is slidably mounted in the ways of crosshead supports 18 and 19 which are also fixed in any suitable way on the frame.

One side of the crosshead is provided with a first releasable test grip 21 for clamping one end of the sample S, the other end of which is clamped in a second releasable test grip 22 of the floating type supported slidably on frame 1.

As shown in FIGURES 1 and 2, housing 3 has a firing head 25 including a firing pin 26 which can be put into the cocked position by means of cocking arm 27 and released through any suitable mechanism by a pull on trigger 28 for setting off the explosive charge 6.

As shown in FIGURES 2, 3, and 4, fixed to the underside of the housing 3 is a recoil sleeve 30 which receives through it a recoil rod 31 slidably for movement, except when the rod is carried fixed to the sleeve by the action of a locking screw 32 when the latter is turned down against the side of the rod as at the flat 33. When loosened, screw 32 allows housing 3 and the attached sleeve to be moved rearwardly as the barrel 4 is held or fixed in the position shown in FIGURE 1 so as to allow the housing and its firing head 25 to be moved and separate the head rearwardly from the breech of the barrel to allow for cartridge loading and extraction through the housing side port 34. For the purpose of returning the piston to its initial position adjacent the breech by further rearward movement of the housing 3 and for frictionally retaining the piston in the barrel at that position shown in FIGURE 1, the housing is provided with an internal stop 35 coacting with a mating stop 36 carried by the piston with outward bias pressing external shoulders on stop 36 against the interior of barrel bore on each side of a suitable barrel slot 37 extending longitudinally for reception and movement of stops 35 and 36.

Locking screw 32 is screw threadedly carried in one side of sleeve 30 and protrudes outwardly through a slot 38 formed of adequate length in one of the gun base uprights 2 to allow for recoil movement of housing 3, sleeve 30, rod 31, and the screw 32 as a unit when the locking screw is clamped against the recoil rod 31. Recoil action occurs against the recoil spring 39 carried in compression in a suitable cavity in a recoil block 40 mounted on the frame for carryng the recoil spring in abutment with a head portion 41 of the recoil rod, retained between block 40 and an upraised portion of frame 1 extending between crosshead supports 18 and 19 as shown in FIGURE 2. Bearing slidably on the bottom of recoil tube 30 is a gun leveling screw 42.

For fine adjustment of the loading control buffer 16, there is an adjusting screw 44 carried by the anvil 15 for varying the initial compression of the buffer by action of the screw head through washer 45 and collar 46 to pull the anvil face back with respect to the crosshead 17.

Detection of the stress occurs at the load cell comprising the calibrated strip 50 of metal of well known properties such as a steel fixed at one end by any suitable fastener 51 to the floating grip 22 and at the other end by any suitable fastener 52 to an L-shaped holding block 53. This block is mounted to ride on frame 1 and upright 2′ guided in proper alignment with adjustability at its longitudinal slot 54 running parallel to the common axis of the piston and anvil by means of aligning and clamping bolts 55 and 56 screwthreadedly carried by the frame. Carried on strip 50 are strain gauges 58 and 59 connected to input posts of a suitable recording device by the electrical leads shown in part.

As shown in FIGURE 3, detection of the strain occurs with the aid of the flying inclined surface or wedge 61 carried by the crosshead 17 for bearing on the free end of the beam 62 initially flexed as the other end of the beam is mounted on a cantilever support 64 fixed on the frame. Carried on the beam are suitable strain gauges 64 and 65 connected by electrical leads to posts of an associated recording device such as an oscilloscope not shown.

On the far or right side of the apparatus shown in FIGURE 1, there is provided any suitable back-stop such as a thick plate of polyurethane foam (not shown) and which also may be fastened to the frame to catch the crosshead.

The blank rimfire shells 6 used are commercially available cartridges each carrying a relatively low charge of from about 1½ to about 2½ grains of a suitable double base powder.

Since the whole apparatus need not weigh more than about 15 pounds and has a length of about 15 inches, a width not more than about 12 inches, and a height of about 3 inches, it is quite portable.

In operation, when the device is fired using a standard 0.22 caliber load, the piston 5 is rapidly accelerated during the firing cycle over about 0.5 of an inch of its travel for about 0.8 of a millisecond (at which point the propellant gases are dumped) to bring it up to a predetermined velocity. Near the end of its stroke (at about 1.6 inch of travel) it impacts the anvil 15 and causes the control buffer 16 to be compressed and drive the crosshead 17 at the end of the firing cycle. By the action of the buffer the crosshead is normally accelerated completely within from about 0.050 to 0.070 of an inch of its motion during which the strip 50 of load cell is put in tension and the end of the cantilever beam 62 of the displacement gauge follows the inclined plane 61 carried by the moving crosshead.

During firing the following conditions occurred: (1) because of the relatively long piston acceleration, the crosshead is accelerated by piston impact and not by direct piston coupling, (2) the crosshead is rapidly accelerated to avoid excessive initial straining of the test specimen before the desired test strain rate can be achieved, (3) the impacted anvil flexibly coupled with damping to the crosshead avoids impact loading of the specimen and provides desired modification of the high rate of crosshead acceleration, (4) the force induced in the test specimen and the displacement are measured, and (5) operating performance of the device remains equally satisfactory throughout the temperatures required for testing.

The rate of specimen strain applied by the crosshead is determined primarily by (a) the powder charge, (b) the piston weight and impact velocity, (c) the control buffer size, nature of the buffer material, and the initial buffer compression which is made adjustable by the action of any suitable compression controller such as screw 44, or a nut carried on a threaded end of the anvil shank, and (d) the combined weight of the movable crosshead, buffer, and anvil assembly.

Using a test specimen having the configuration shown in FIGURE 5, FIGURE 6 shows a record obtained for one specimen of high density linear polyethylene subject to a strain rate of 39,000 inches per inch per minute at 70° Fahrenheit and yielding at about 10,200 p.s.i. The record shows that after the ends of a specimen are stabilized and elongated, a substantially constant high rate of strain is obtainable in the test specimen.

By increasing the test span length of the specimen and/or by other suitable changes such as reducing the powder charge, it is possible with the present device to make tests and measurements at high rates of strain considerably less than 20,000 inches per inch per minute. In general, testing can be done and is contemplated for all sorts of materials at rates from about 5,000 inches per inch per minute up to any higher rate attainable with this device to a maximum of about 75,000 inches per inch per minute.

By means of the device of this invention, performance data on the dynamic properties and response of high molecular weight linear polyethylene at various high strain rates between about 20,000 inches per inch per minute and about 50,000 inches per inch per minute at temperatures ranging as low as −40° F. was readily obtained. Experimental data obtained for various samples of high density linear polyethylene at 70° F. are shown in the following table.

TABLE.—HIGH DENSITY LINEAR POLYETHYLENE [1]

| Sample | Strain rate (in./min.) | Yield Stress, p.s.i. | Maximum stress, p.s.i. | Dynamic Modulus |
|---|---|---|---|---|
| Type I-A [2] | 20,000 | 18,500 |  | 229,000 |
|  | 30,000 | 20,500 | 26,500 | 209,000 |
|  | 31,000 | 21,000 | 24,000 | 165,000 |
|  | 31,000 | 24,000 | 27,000 | 230,000 |
|  | 34,000 | 24,000 |  | 149,000 |
|  | 38,000 | 28,000 |  | 239,000 |
|  | 39,000 | 24,000 | 28,000 |  |
|  | 39,000 | 25,000 | 34,000 | 210,000 |
|  | 42,000 | 28,000 |  | 168,000 |
|  | 43,200 | 26,000 |  | 171,750 |
|  | 44,000 | 27,000 |  | 156,000 |
| Type I-P [3] | 2 (Instron) | 15,000 |  |  |
|  | 21,500 | 7,200 |  | 110,000 |
|  | 31,000 | 8,800 |  | 56,800 |
|  | 32,000 | 11,600 |  | 112,000 |
|  | 37,000 | 10,400 |  | 72,000 |
|  | 39,000 | 11,000 |  | 72,000 |
| Type II-A [4] | 2 (Instron) | 4,800 |  |  |
|  | 25,000 | 6,200 |  | 54,000 |
|  | 34,500 | 6,200 |  | 49,000 |
| Type II-P [5] | 49,000 | 8,800 |  | 43,000 |
|  | 17,000 | 5,000 |  | 73,000 |
|  | 30,000 | 5,700 |  | 43,000 |
|  | 38,250 | 9,000 |  | 69,000 |

[1] All tests conducted at 70° F.
[2] I-A is the sample produced by special process and cut in axial (machine) direction.
[3] I-P is the sample produced by special process and cut in perpendicular direction.
[4] II-A is the sample produced by conventional process and cut in axial direction.
[5] II-P is the sample produced by conventional process and cut in perpendicular direction.

It is evident from the foregoing description and explanation that testing of elastomeric materials can be extended to ultra-high distortion rates with this device without sacrificing test rate linearity. The actual rate of strain the material can withstand is related to its sonic velocity. The device of this invention being adjustable allows testing within permissible strain rates as dictated by the sonic velocities of the material being tested. By avoiding high forces and massive parts heretofore believed necessary, advantages of small size and portability are achieved; this allows the whole unit to be placed in conventional temperature boxes.

It will be understood that while the device has been described in the foregoing as a tensile tester, with suitable modification the device can be adapted for testing the material in compression, or in shear.

It is also to be understood that although the device described is now believed to be a preferred embodiment, those skilled in the art may make changes and modifications without departing from the spirit and scope of this invention as set forth in the appended claims.

What is claimed is:

1. Apparatus for dynamic testing of the stress-strain characteristics of rate-sensitive materials at high rates of strain comprising a frame; a gun housing, barrel, and an explosive cartridge firing head supported on said frame; a piston slidably mounted in said barrel for axial movement from an initial position to a final position of said piston to develop a test force; a crosshead mounted on said frame for axial movement, said crosshead having means for applying said force to one portion of a test specimen of said material; means for fixing another portion of said specimen relative to said frame; and a crosshead driving control buffer mounted for receiving the impact of said piston adjacent said final position and for driving said crosshead by the force derived from said piston impact, said buffer being a resilient member of elastomeric material for controlling the driving force applied to said crosshead to obtain a substantially constant high strain rate over a testing interval of time such as to subject the material of said specimen between said portions to said strain rate without accompaniment of excessive transients.

2. The apparatus of claim 1 for testing resinuous plastic and elastomeric material, wherein the buffer is mounted for compression and consists of a polyurethane rubber.

3. The apparatus of claim 1 for testing at low temperatures wherein the buffer is mounted for compression and consists of a natural rubber.

4. The apparatus of claim 1 for testing at high temperatures, wherein the buffer is mounted for compression and consists of a silicone rubber.

5. The apparatus of claim 1 for the tensile testing of high density linear polyethylene at strain rates of at least 5,000 inches per inch per minute and as high as about 75,000 inches per inch per minute, wherein the buffer consists of polyurethane rubber.

6. The apparatus of claim 1 including an anvil positioned intermediate the piston and driving control buffer for directly receiving and transmitting the impact of said piston to said buffer.

7. The apparatus of claim 6 including means for mounting the buffer with initial compression between the anvil and the crosshead, said means being adjustable to vary the degree of compression.

8. The apparatus of claim 6 including means for replaceably mounting one of a series of driving control buffers each different in at least one of the buffer composition and the buffer size.

9. The apparatus of claim 1 for dynamic testing and measuring of the characteristics, said apparatus including means for measuring the stress and means for measuring the strain occurring in the specimen and means for quantitatively recording said stress and strain.

10. The apparatus of claim 9 wherein the means for fixing a portion of the test specimen relative to the frame includes the stress measuring means comprising a calibrated member connected in series with the specimen an end of which is attached to one end of said member, said member mounting a strain gauge responsive to the stress and the other end of said member being fixed to the frame.

11. The apparatus of claim 10 wherein the calibrated member is fixed to the frame adjustably to allow for reception of different lengths of specimen and said member.

12. The apparatus of claim 9 wherein the strain detector includes a cantilever beam mounted on the frame and wherein the free end of said beam is initially flexed by and follows an inclined plane carried by the movable crosshead in a manner biasing said free end against said plane and permitting the beam to unflex as said crosshead is displaced by the derived force on impact, said beam mounting a strain gauge responsive proportionately to the crosshead displacement and specimen strain.

13. An explosive cartridge actuated apparatus for dynamic testing and measuring of the stress-strain characteristics of specimens of resinous plastic and elastomeric materials such as olefinic polymers and the like at high rates of tensile strain in the range from about 5,000 inches per inch per minute to about 75,000 inches per inch per minute, comprising means to fire said cartridge for generating a propellant gas at relative low energy levels;
a piston reciprocatably mounted in said apparatus for movement and adapted to be driven by said gas from an initial position to a final position of said piston to develop an impact force at high velocities;
a crosshead mounted in said apparatus in alignment with said piston for movement responsive to impact of said piston, said crosshead having means for applying a test force to one end of a specimen the other end of which is held fixed;
an anvil mounted on said crosshead for limited slidable movement relative to said crosshead for receiving said impact force adjacent said final position; and
a control buffer of elastomeric material mounted on said anvil and crosshead for being put in compression between said anvil and crosshead and converting said impact force to said test force driving said crosshead to obtain a substantially constant rate of permissible high strain in said specimen without excessive transients,
said apparatus including adjustable means for putting said buffer under initial precompression.

References Cited by the Examiner

"Explosive Press for Use in Impulsive Loading Studies," by La Rocca et al., Review of Scientific Instruments, vol. 29, No. 10, October 1958, pp. 848–851.

RICHARD C. QUEISSER, *Primary Examiner.*